(12) United States Patent
Sundararajan et al.

(10) Patent No.: US 8,417,965 B1
(45) Date of Patent: Apr. 9, 2013

(54) METHOD AND CIRCUIT FOR SECURE DEFINITION AND INTEGRATION OF CORES

(75) Inventors: Arvind Sundararajan, Sunnyvale, CA (US); Chi Bun Chan, San Jose, CA (US); Nabeel Shirazi, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 470 days.

(21) Appl. No.: 12/755,760

(22) Filed: Apr. 7, 2010

(51) Int. Cl.
- G06F 11/30 (2006.01)
- G06F 12/14 (2006.01)
- G06F 7/04 (2006.01)
- G06F 17/30 (2006.01)
- G06F 9/445 (2006.01)
- H04L 29/06 (2006.01)
- H04L 9/00 (2006.01)
- H04L 9/30 (2006.01)
- H04K 1/00 (2006.01)
- H04N 7/16 (2011.01)

(52) U.S. Cl.
USPC ............. 713/189; 713/150; 713/187; 380/30; 726/26; 717/174

(58) Field of Classification Search .................. 713/150, 713/187, 189
See application file for complete search history.

(56) References Cited

U.S. PATENT DOCUMENTS

| | | | | |
|---|---|---|---|---|
| 4,731,843 A * | 3/1988 | Holmquist | | 380/29 |
| 5,058,162 A * | 10/1991 | Santon et al. | | 705/51 |
| 5,530,753 A * | 6/1996 | Easter et al. | | 713/191 |
| 5,671,284 A * | 9/1997 | Buer | | 380/29 |
| 5,703,950 A * | 12/1997 | Jovanovich et al. | | 380/249 |
| 5,774,544 A * | 6/1998 | Lee et al. | | 713/189 |
| 5,835,599 A * | 11/1998 | Buer | | 380/29 |
| 5,970,142 A * | 10/1999 | Erickson | | 713/189 |
| 5,978,476 A * | 11/1999 | Redman et al. | | 705/51 |
| 5,982,899 A * | 11/1999 | Probst | | 713/1 |
| 5,991,399 A * | 11/1999 | Graunke et al. | | 380/279 |
| 6,212,639 B1 * | 4/2001 | Erickson et al. | | 726/26 |
| 6,260,182 B1 * | 7/2001 | Mohan et al. | | 716/121 |
| 6,292,925 B1 * | 9/2001 | Dellinger et al. | | 716/113 |
| 6,305,005 B1 * | 10/2001 | Burnham | | 716/117 |
| 6,357,037 B1 * | 3/2002 | Burnham et al. | | 716/117 |
| 6,457,164 B1 * | 9/2002 | Hwang et al. | | 716/121 |
| 6,525,557 B1 * | 2/2003 | McManus et al. | | 326/8 |
| 6,904,527 B1 * | 6/2005 | Parlour et al. | | 713/189 |
| 7,082,540 B1 * | 7/2006 | Ruparelia et al. | | 713/193 |
| 7,107,567 B1 * | 9/2006 | LeBlanc | | 716/106 |
| 7,117,372 B1 * | 10/2006 | Trimberger et al. | | 713/189 |
| 7,134,025 B1 * | 11/2006 | Trimberger | | 713/189 |

(Continued)

OTHER PUBLICATIONS

U.S. Appl. No. 12/720,563, filed Mar. 9, 2010, Sundararajan et al.

*Primary Examiner* — Carolyn B Kosowski

(74) *Attorney, Agent, or Firm* — LeRoy D. Maunu

(57) ABSTRACT

An embodiment of the present invention provides a method and circuit for secure definition and integration of a core into a circuit design without exposing the core. In one embodiment, a core development package is obtained. The core development package includes an encrypted core and a decryption key of the encrypted core. The decryption key is encrypted with an asymmetric cipher. The encrypted core is transmitted from the design tool to a trusted platform module. The decryption key is decrypted with a private key of the asymmetric cipher. The encrypted core is decrypted within the trusted platform module. One or more design tool operations are performed using the decrypted core.

20 Claims, 5 Drawing Sheets

U.S. PATENT DOCUMENTS

| | | | |
|---|---|---|---|
| 7,162,644 B1 * | 1/2007 | Trimberger | 713/189 |
| 7,165,229 B1 * | 1/2007 | Gathoo et al. | 716/105 |
| 7,184,946 B2 | 2/2007 | Ballagh et al. | |
| 7,191,342 B1 * | 3/2007 | New et al. | 713/190 |
| 7,197,647 B1 * | 3/2007 | Van Essen et al. | 713/189 |
| 7,200,235 B1 * | 4/2007 | Trimberger | 380/277 |
| 7,219,237 B1 * | 5/2007 | Trimberger | 713/193 |
| 7,353,468 B2 * | 4/2008 | Ferguson et al. | 716/102 |
| 7,363,501 B2 * | 4/2008 | Watanabe et al. | 713/182 |
| 7,366,306 B1 * | 4/2008 | Trimberger | 380/278 |
| 7,373,668 B1 * | 5/2008 | Trimberger | 726/26 |
| 7,389,429 B1 * | 6/2008 | Trimberger | 713/194 |
| 7,509,250 B2 * | 3/2009 | Cruzado et al. | 703/28 |
| 7,509,687 B2 * | 3/2009 | Ofek et al. | 726/30 |
| 7,552,419 B2 * | 6/2009 | Zimmer et al. | 717/121 |
| 7,558,967 B2 * | 7/2009 | Wong | 713/189 |
| 7,584,447 B2 * | 9/2009 | Lee et al. | 716/138 |
| 7,596,420 B2 * | 9/2009 | Kiers et al. | 700/121 |
| 7,627,119 B2 * | 12/2009 | Bussert | 380/239 |
| 7,634,664 B2 * | 12/2009 | Ibrahim et al. | 713/189 |
| 7,676,784 B2 * | 3/2010 | Allen et al. | 716/138 |
| 7,685,418 B1 * | 3/2010 | Knight | 713/165 |
| 7,698,664 B2 * | 4/2010 | Ferguson et al. | 716/100 |
| 7,702,927 B2 * | 4/2010 | Devadas et al. | 713/194 |
| 7,711,964 B2 * | 5/2010 | Van Essen et al. | 713/189 |
| 7,747,025 B1 * | 6/2010 | Trimberger | 380/284 |
| 7,757,294 B1 * | 7/2010 | Simkins | 726/26 |
| 7,774,619 B2 * | 8/2010 | Paaske et al. | 713/191 |
| 7,788,502 B1 * | 8/2010 | Donlin et al. | 713/189 |
| 7,797,544 B2 * | 9/2010 | Dillaway et al. | 713/179 |
| 7,937,594 B2 * | 5/2011 | Wasson et al. | 713/189 |
| 7,971,072 B1 * | 6/2011 | Donlin et al. | 713/194 |
| 7,987,373 B2 * | 7/2011 | McElvain | 713/189 |
| 7,996,684 B2 * | 8/2011 | Wasson et al. | 713/189 |
| 8,024,688 B1 * | 9/2011 | Trimberger | 716/117 |
| 8,063,739 B2 * | 11/2011 | Kean | 340/10.1 |
| 8,219,806 B2 * | 7/2012 | Okuyama et al. | 173/164 |
| 8,220,060 B1 * | 7/2012 | Simkins | 726/26 |
| 8,239,182 B2 * | 8/2012 | Kanade | 703/14 |
| 8,245,053 B2 * | 8/2012 | Hoang et al. | 713/189 |
| 2001/0015919 A1 * | 8/2001 | Kean | 365/200 |
| 2002/0150252 A1 * | 10/2002 | Wong | 380/277 |
| 2002/0199110 A1 * | 12/2002 | Kean | 713/189 |
| 2003/0140255 A1 * | 7/2003 | Ricchetti et al. | 713/201 |
| 2005/0021968 A1 * | 1/2005 | Zimmer et al. | 713/176 |
| 2005/0177749 A1 * | 8/2005 | Ovadia | 713/201 |
| 2005/0210467 A1 * | 9/2005 | Zimmer et al. | 718/1 |
| 2006/0075374 A1 * | 4/2006 | McElvain | 716/17 |
| 2007/0293973 A1 * | 12/2007 | Kiers et al. | 700/121 |
| 2008/0061980 A1 * | 3/2008 | Kean | 340/572.1 |
| 2008/0270805 A1 * | 10/2008 | Kean | 713/189 |
| 2010/0205459 A1 * | 8/2010 | Schwarz | 713/190 |
| 2011/0210829 A1 * | 9/2011 | Kean | 340/10.42 |

\* cited by examiner

METHOD AND CIRCUIT FOR SECURE DEFINITION AND INTEGRATION OF CORES

FIELD OF THE INVENTION

An embodiment of the present invention generally relates to block diagram based hierarchical design tools, and more particularly to the protection of reusable cores.

BACKGROUND

Programmable integrated circuits (ICs) are a well-known type of integrated circuit that may be programmed to perform specified logic functions. One type of programmable IC, the Field Programmable Gate Array (FPGA), typically includes an array of programmable tiles. These programmable tiles can include, for example, Input/Output Blocks (IOBs), Configurable Logic Blocks (CLBs), dedicated Random Access Memory Blocks (BRAMs), multipliers, Digital Signal Processing blocks (DSPs), processors, clock managers, Delay Lock Loops (DLLs), Multi-Gigabit Transceivers (MGTs) and so forth.

Each programmable tile typically includes both programmable interconnect and programmable logic. The programmable interconnect typically includes a large number of interconnect lines of varying lengths interconnected by Programmable Interconnect Points (PIPs). The programmable logic implements the logic of a user design using programmable elements that may include, for example, function generators, registers, arithmetic logic, and so forth.

The programmable interconnect and the programmable logic are typically programmed by loading a bitstream of configuration data into internal configuration memory cells during a configuration event that defines how the programmable elements are configured. The configuration data may be read from memory (e.g., from an external PROM) or written into the FPGA by an external device. The collective states of the individual memory cells then determine the function of the FPGA.

Another type of programmable IC is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these PLDs, the functionality of the device is controlled by configuration data bits provided to the device for that purpose. The configuration data bits can be stored in volatile memory (e.g., static memory cells, as in FPGAs and some CPLDs), in non-volatile memory (e.g., FLASH memory, as in some CPLDs), or in any other type of memory cell.

Due to advancements in processing technology, complex integrated circuits (ICs) can be designed using various levels of abstraction. Using a hardware description language (HDL), circuits can be designed at the gate level, the register transfer level (RTL), and higher logical levels. When designing using an HDL, the designer describes the behavior of a system in terms of signals that are generated and propagated through combinatorial modules from one set of registers to another set of registers. HDLs provide a rich set of constructs to describe the functionality of each module. Modules may be combined and augmented to form even higher-level modules.

System-level integration relies on reuse of previously created designs, from either within an enterprise or from a commercial provider. Libraries of pre-developed blocks of logic have been developed that can be included in an FPGA design. Such library modules include, for example, adders, multipliers, filters, and other arithmetic and DSP functions from which system designs can be readily constructed. The engineering community sometimes refers to these previously created designs as "design modules," "cores," "IP cores" (intellectual property cores), or "logic cores," and such terms are used interchangeably herein. The use of pre-developed logic cores permits faster design cycles by eliminating the redesign of circuits. Thus, using cores from a library may reduce design costs. IP cores can provide, but are not limited to, digital signal processing (DSP) functions, memories, storage elements, and math functions.

IP cores can include a predetermined set of configuration bits that program the FPGA to perform one or more functions. Some IP cores include an optimally floorplanned layout targeted to a specific family of FPGAs. Alternatively, an IP core can include source code or schematics that describe the logic and connectivity of a design. IP cores including source code may be parameterizable, i.e., allowing the user to enter parameters to activate or change certain core functionality. These cores also allow the developer to simulate the core functionality with the rest of a design for testing and debugging purposes.

High level modeling and design implementation tools, such as the System Generator for Digital Signal Processing (DSP) (SysGen), may be used to generate each core. SysGen, for example, provides a block diagram based user interface for designing and debugging complex systems such as those found in highly parameterizable and reusable cores.

Once a core is generated, it may be deployed and incorporated into larger designs that utilize the functionality provided by the core. Such cores may often be available for purchase by third parties who desire the functionality provided by the core, but don't have the time and/or resources necessary to design them.

Each core, therefore, represents valuable content that, within conventional modeling and design implementation tools, may only be protected through rudimentary means. As a result, such cores may be easily "reverse engineered" and pirated with low reverse engineering costs for use by unauthorized third parties. Relatively low reverse engineering costs are possible in part because a source transformation is generally utilized to convert the block diagram based connectivity graph to a human readable format, such as a hardware design language (HDL) format, that describes the structural connectivity. Such descriptions of structural connectivity are easily reverse engineered, which facilitates unauthorized usage by third parties.

One or more embodiments of the present invention may address one or more of the above issues.

SUMMARY

In one embodiment of the present invention, a method is provided for the secure definition of a programmable core design using a block diagram based design tool. A core development package is obtained. The core development package includes an encrypted core and a decryption key of the encrypted core. The decryption key is encrypted with an asymmetric cipher. The encrypted core is transmitted from the design tool to a trusted platform module. The decryption key is decrypted with a private key of the asymmetric cipher. The encrypted core is decrypted within the trusted platform module. One or more design tool operations are performed using the decrypted core. The decrypted core is stored in a processor-readable storage device.

In another embodiment, a configurable core interface circuit for secure core distribution is provided. The configurable core interface circuit includes a decryption block, a processing block, an I/O interface, a memory unit, and a storage unit coupled to a common bus. An asymmetric private key is stored in the storage unit. The trusted platform module is configured to receive a secure core development package including an encrypted core and a decryption key of the encrypted core, the decryption key encrypted with an asymmetric public key corresponding to the private key. The trusted platform module is configured to: decrypt the decryption key with the private key and decrypt the encrypted core with the decrypted decryption key; store the decrypted core storing the decrypted core in a processor-readable storage device; perform one or more design tool functions using the decrypted core to produce an output in response to a signal received from a design tool; and transmit the output to a design tool.

In another embodiment a method is provided for secure distribution of a core design. A request for a core is received. The request includes a core indicator and a trusted platform module serial number. A core corresponding to the core indicator is encrypted with a symmetric cipher. An asymmetric public key corresponding to the serial number is retrieved and a decryption key corresponding to the symmetric cipher is encrypted with the asymmetric public key. The encrypted core and encrypted decryption key is delivered in a non-transitory signal-bearing medium.

BRIEF DESCRIPTION OF THE DRAWINGS

Various aspects and advantages of the invention will become apparent upon review of the following detailed description and upon reference to the drawings in which:

FIG. 2 illustrates an implementation where minimal logic core operations are performed on the TPM. FIG. 3 illustrates an implementation where extensive logic core operations are performed on the TPM.

DETAILED DESCRIPTION

Typically when integrating an IP core into a circuit design, the design tool requires access to the IP core design for placement, routing and generation of a configuration bitstream for the complete design. Access to the IP core design may also be necessary for simulation and debugging by a developer. The IP core may be provided to the design entry tool coded in a design language, such as hardware description language (HDL), or may be provided in the form of a netlist, which specifies the hardware components necessary to implement the IP core and connectivity of the components. However, in this unprotected form, an IP core may easily be reverse engineered to reveal the IP core design to an unauthorized third party.

An embodiment of the present invention provides a method and circuit for secure definition and integration of an IP core into a circuit design without exposing the design of the IP core. The secure integration of an IP core is achieved by distributing the IP core to developers in an encrypted form and utilizing secure hardware, such as a trusted platform module (TPM), to privately access the IP core design. For example, in one embodiment a distributed IP core development package includes an encrypted logic core and a decryption key of the encrypted logic core. The decryption key is encrypted with an asymmetric cipher corresponding to a particular TPM. During development, the encrypted logic core is transmitted from the design entry tool to the TPM. The decryption key is decrypted with a private key of the asymmetric cipher. The encrypted logic core is decrypted within the TPM using the decrypted private key. Once decrypted, secure operations using the decrypted logic core can be performed within the trusted platform module.

Figure 1:
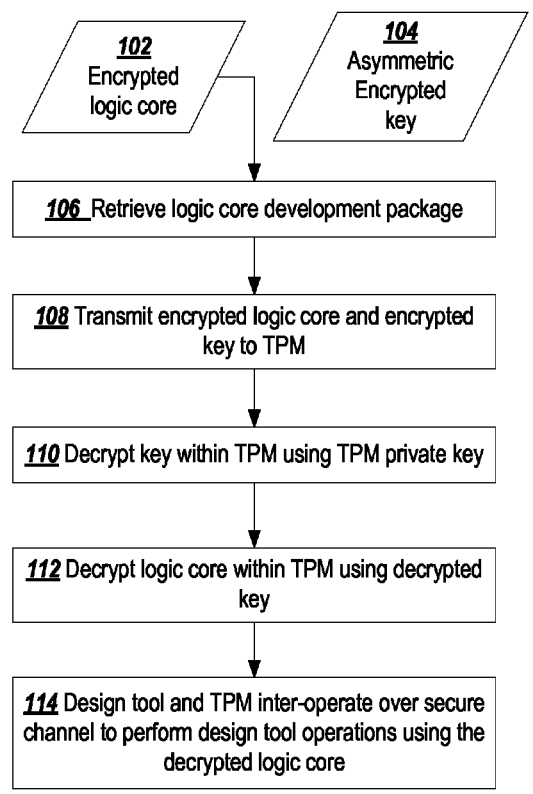
FIG. 1 shows a flowchart of an example process for performing decryption and logic core operations using a trusted platform module (TPM) in accordance with an embodiment of the invention.

FIG. 1 shows a flowchart of an example method for incorporating a secure IP core in accordance with an embodiment of the invention. An IP core development package is received by a design entry tool at step 106. The IP core development package includes an encrypted logic core 102 and an encrypted decryption key 104 for the encrypted logic core. The IP core development package may be stored and distributed on a CD-ROM, diskette, or other form of media capable of portably storing information and loaded into the design entry tool using an input output device such as a CD-ROM drive. The encrypted core(s) may also be downloaded by the design entry tool from a server via a network, such as the Internet.

In this example, the IP core is encrypted with a symmetric cipher scheme (SCS) and the decryption key is encrypted with the public key of an asymmetric cipher scheme (ACS). The private key of the asymmetric cipher scheme is stored within the TPM. Several encryption algorithms known in the art may be used to implement the synchronous and asynchronous cipher schemes such as one-time pad, AES, DES, RSA, RC5, etc. One skilled in the art will recognize that either encryption scheme can be used to transport the IP core and key. For example, the decryption key can alternately be encrypted with a symmetric cipher key that is stored within the TPM.

The encrypted logic core and encrypted key are transmitted from the design entry tool to the TPM at step 108. The decryption key is decrypted using the private key stored within the TPM at step 110. The encrypted IP core is decrypted using the decrypted symmetric key at step 112. After decryption is completed, the design entry tool and the TPM interoperate over a secure channel to securely perform design tool operations using the decrypted IP core at step 114.

A TPM is implemented to protect against unauthorized tampering and should be adequately protected to avoid compromise of the cryptographic keys or unencrypted data contained within the TPM, such as through the use of a zeroizer to destroy the keys and/or unencrypted data upon the detection of a physical attack on the TPM. In one or more embodiments of the present invention, the TPM and design tool may be configured to perform a number of different design tool operations within the secure environment of the TPM depending on the level of security desired and the capabilities of the TPM used.

In one embodiment, the TPM may be configured only to securely decrypt the IP core and transmit the decrypted IP core to the design entry tool. The design entry tool is configured to use the decrypted IP core for background processes that do not reveal the decrypted IP core design to the developer. In this embodiment, the TPM need only be configured to decrypt and transmit the IP core to the design entry tool when requested.

Figure 2:
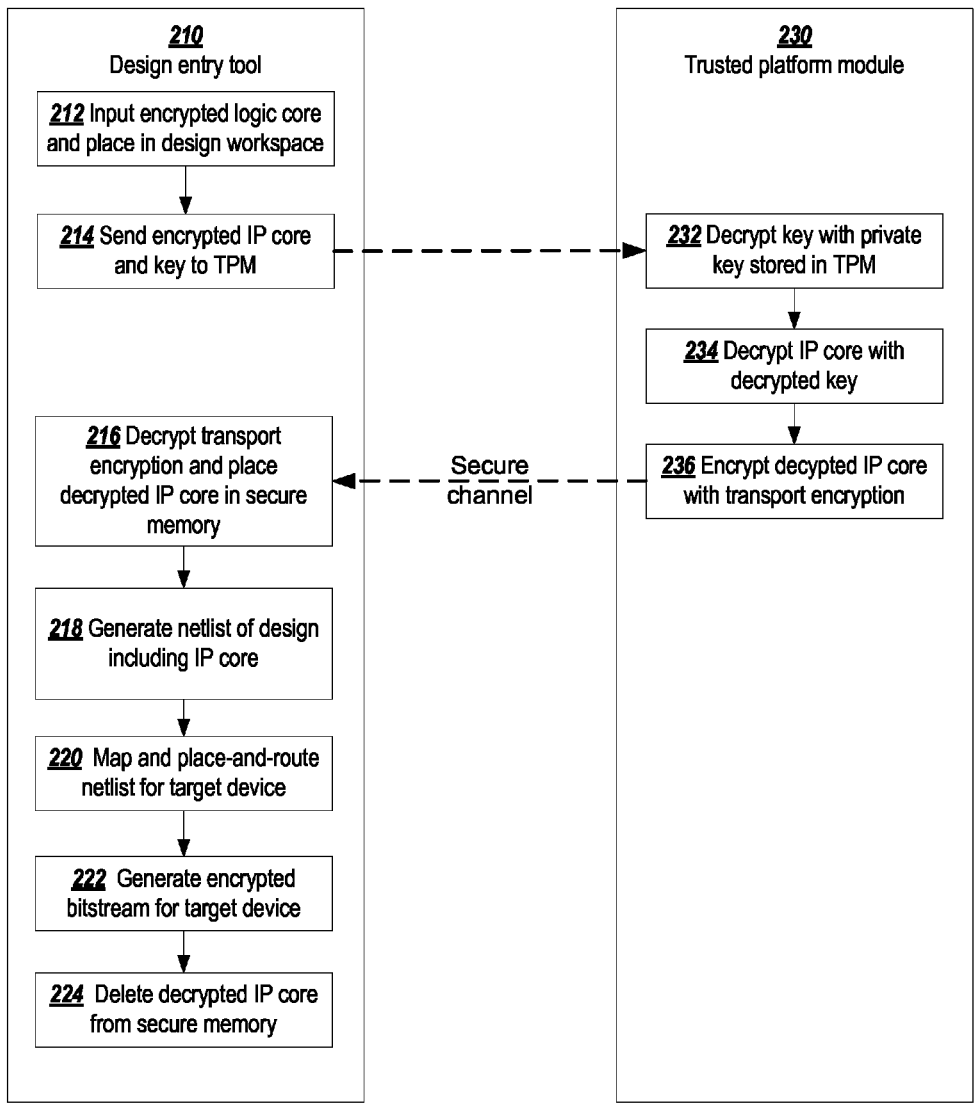
FIGS. 2 and 3 show two flow charts performing decryption and logic core operations using a trusted platform module.

FIG. 2 shows a flowchart of an example process for incorporating a secure IP core into a design in accordance with an embodiment of the invention. An encrypted IP core is input to a design entry tool 210 and placed into a design workspace at step 212. A design workspace contains the various files of a design project in an organized fashion. The design entry tool 210 sends the encrypted IP core and associated encrypted key to TPM 230 at step 214. The TPM decrypts the key with a private key stored in the TPM at step 232. The encrypted IP core is decrypted with the decrypted key at step 234. The TPM sends the decrypted IP core to the design entry module at step 236 using a secure communication channel. The design entry tool decrypts transport encryption of the secure channel and places the decrypted IP core in secure memory at step 216.

Design tool operations can then be performed using the decrypted IP core within the design entry tool. In this example, a netlist is generated for the entire design at step 218. The netlist is mapped, placed, and routed for a target device at step 220. An encrypted configuration bitstream for the target device is then generated. The decrypted IP core is deleted from secure memory at step 224. In this manner, the decrypted bitstream can be securely input to the design entry tool.

In this example, the design entry tool 210 is assumed to be secure in that it is configured to not reveal the decrypted IP core to the developer. However, a design entry tool may be modified or hacked by an attacker to reveal or store the decrypted IP core once it is received from the TPM. To prevent this scenario, in one embodiment of the present invention, the TPM authenticates the design entry tool before transmitting the decrypted IP core. Authentication may include a certificate exchange and/or computation and comparison of a checksum of the design entry tool program to a trusted checksum value. In this manner, the TPM can ensure that the design entry tool has not been modified.

However, even when the design entry tool has been authenticated, security cannot be guaranteed. For example, although extremely difficult, it may be possible for a skilled attacker to perform advanced monitoring and analysis of memory used by the design entry tool to retrieve the decrypted IP core. Some embodiments of the invention may perform many if not all operations, using the decrypted IP core, within the secure environment of the TPM.

Figure 3:
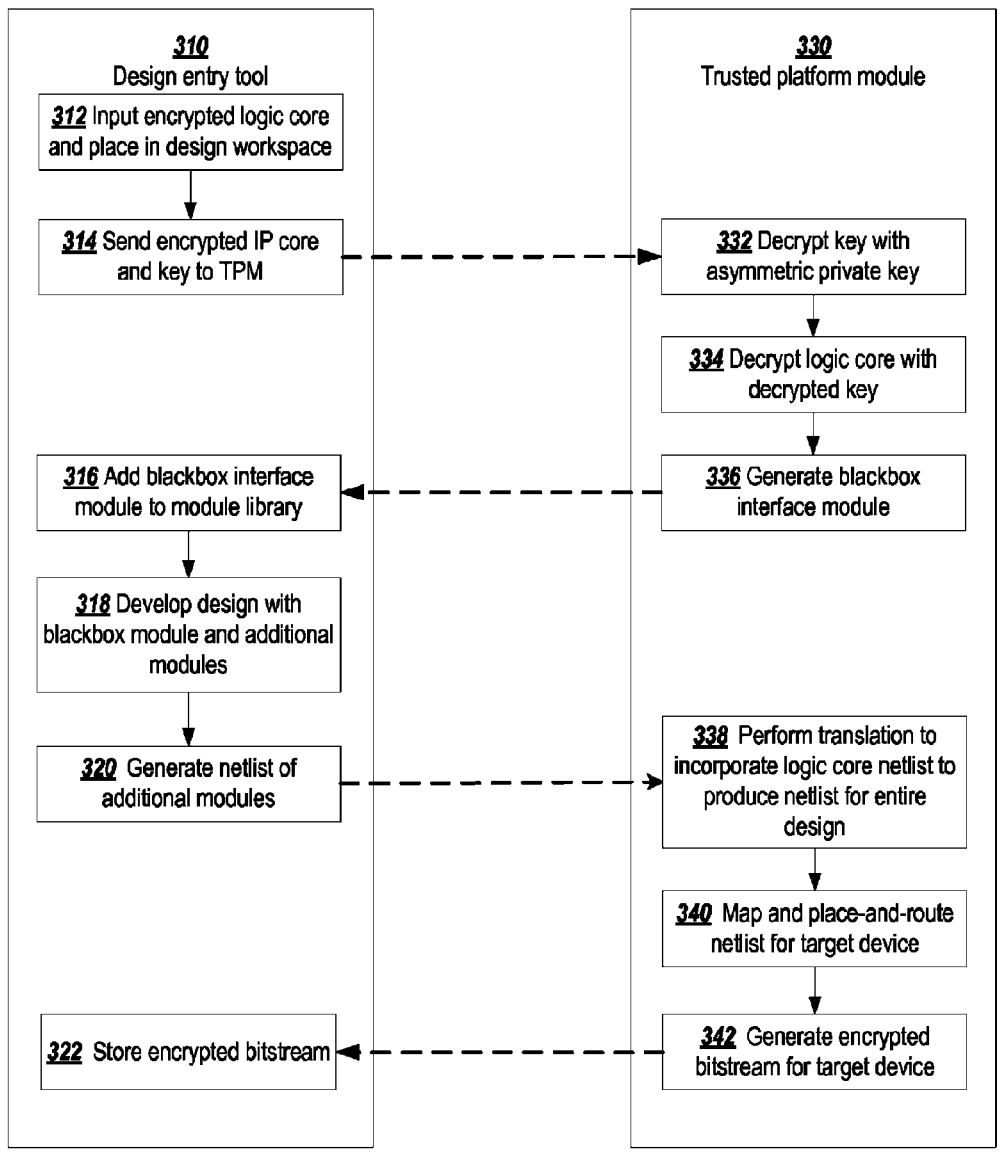

FIG. 3 shows a flowchart of an example process for incorporating a secure IP core into a design, where the TPM is configured to incorporate the decrypted IP core into a design within the TPM in accordance with an embodiment of the invention. An encrypted IP core is input to a design entry tool 310 and placed into a design workspace at step 312. The design entry tool 310 sends the encrypted IP core and associated encrypted key to TPM 330 at step 314. The TPM decrypts the key with a private key stored in the TPM at step 332. The encrypted IP core is decrypted with the decrypted key at step 334. The TPM generates a blackbox interface module and transmits the module to the design entry tool at step 336. The blackbox interface module is added to the module library within the design entry tool 310 at step 316. The blackbox interface module specifies the input and output ports of the IP core to the design entry tool, and facilitates communication between the design entry tool 310 and the TPM 330 during development. A circuit design is developed incorporating the IP core with additional modules, via the blackbox interface module, at step 318.

This example illustrates the manner in which an encrypted bitstream may be generated from the resulting design. The design entry tool 310 generates a netlist of the additional modules at step 320 and sends the generated netlist to the TPM 330. Within the TPM 330, translation of the design is performed to produce a netlist of the entire design, including the decrypted IP core, at step 338. The netlist is mapped, placed, and routed for a target device at step 340. An encrypted configuration bitstream for the target device is then generated at step 342. The encrypted bitstream is transmitted to the design entry tool and stored in memory at step 322.

Communications between the design entry tool 310 and the TPM 330 may or may not be performed using secure communication channels depending on the level security needed and the operations being performed. For example, in the process shown in FIG. 3, the IP core is transmitted to the TPM in an encrypted format and no secure data is transmitted back to the design entry tool. Therefore, secure communication channels may not be necessary in order to protect the IP core from being obtained by an attacker. However, in some implementations it is foreseen that an attacker may be able retrieve the decrypted IP core by pretending to be the trusted design entry tool after authentication has been performed. This is commonly known as a man in the middle attack. In environments where such an attack is foreseeable, it may be desirable to use a secure communication channel for all data communicated between the design entry tool and the TPM.

Secure channels may be established using various public key authentication and key exchanged methods known in the art. Authentication may also be employed between the design entry tool and the TPM, whereby certificate-based authentication is used. Other licensing schemes using FLEXlm®, for example, may be used to limit the use of the TPM. The TPM may also employ revocation of used asymmetric keys so as to reduce the use of previously used keys that may have been compromised.

Once the design entry tool and the TPM have been mutually authenticated to one another, communication between the TPM and the design entry tool is initiated over a secure channel. The design entry tool may then interact with the TPM to decrypt and enable the use of the IP core within the overall design using a specific set of commands.

Session keys may also be exchanged between the design entry tool and the TPM to further secure their mutual run-time communication. In particular, session keys may be utilized to access specific portions of the unencrypted IP core from the TPM. Read requests, for example, may be issued by the design entry tool to the TPM, whereby the TPM returns the requested objects encrypted with the session key. The design entry tool then decrypts the requested objects using the session key and then destroys the unencrypted objects as soon as operations on those objects complete.

The example shown in FIG. 3 illustrates performing incorporation of the decrypted IP core into a circuit design within a TPM. One skilled in the art will understand that the TPM may be configured to perform other design tool operations as well, such as simulation and debugging. During the process of developing a circuit design, the behavior of the design is often simulated to verify correct behavior prior to physical implementation of the circuit. Wasted manufacturing costs due to faulty design may thereby be avoided. Numerous tools are available for simulating circuit designs including, for example, high-level modeling systems (HLMS) and hardware description language (HDL) simulators. These simulators are often incorporated into the design entry tool. In order to verify how a circuit design will behave when realized in hardware, a simulation model, which is both bit-accurate and cycle-accurate, is used. Sometimes separate simulations are performed to generate control data from the bit-accurate simulation and timing data from the cycle accurate simulation.

In one embodiment of the invention, one or more simulation models of the IP core may be implemented within the TPM. In this embodiment, the blackbox interface module contains code, sometimes referred to as a wrapper code, configured to forward input values to the TPM for simulation and output simulation data results received from the TPM. The process of simulating a module external to the design entry tool is referred to as co-simulation. Co-simulation and generation of HDL wrapper code is described in detail in U.S. Pat. No. 7,184,946, which is incorporated by reference herein.

In another embodiment, the TPM may be configured to generate a simulation executable for the IP core once the IP core is decrypted. The generated simulation executable is sent to the design entry tool for simulation. In this embodiment the blackbox interface module contains wrapper code configured to forward input values to the simulation executable during simulation and output values received from the simulation executable. In yet another embodiment, external bit-accurate and/or cycle-accurate simulation models may be included within the IP core development package and need not be generated by the TPM. In this embodiment, the included simulation models may be executed within the design entry tool or within the TPM as desired.

The decryption key of the IP core may be encrypted with the key corresponding to a specified TPM at several different times. In one embodiment of the present invention, the decryption key is encrypted when a customer purchases an IP core. When an order is placed the customer identifies an available TPM. In one example implementation, the customer supplies a serial number of the TPM. The IP core vendor retrieves the key corresponding to the TPM using the serial number and encrypts the decryption key with the retrieved key. In another example implementation, the IP core vendor retrieves the public key corresponding to the TPM serial number from a trusted third party asymmetric public key server. The vendor encrypts the decryption key with the retrieved public key.

In another embodiment, the decryption key may be encrypted and sent to the customer at runtime. In this embodiment, the design entry tool connects to a remote server to retrieve the decryption key after the encrypted IP core has been loaded into the design entry tool. In one example implementation, the design entry tool establishes a connection to the remote server and uploads a serial number corresponding to an available TPM. The remote server retrieves a public key corresponding to the TPM serial number from a trusted third party asymmetric public key server. The remote server encrypts the decryption key with the retrieved public key and sends the encrypted decryption key to the design entry tool. The IP core may then be decrypted using the specified TPM as indicated in the above embodiments.

The TPM may be implemented using several different hardware architectures. In one embodiment, the TPM may be implemented by an on-board integrated circuit or co-processor that attaches to the system bus of the computer that hosts the design entry tool. In an alternate embodiment, the TPM may be realized by an external hardware module, such as a universal serial bus (USB) dongle, that connects to the host computer via a USB port on the host computer. In yet another embodiment, the TPM may be realized by an external secure server that accepts secured communications with the design entry tool over a wired or wireless network.

Figure 4:
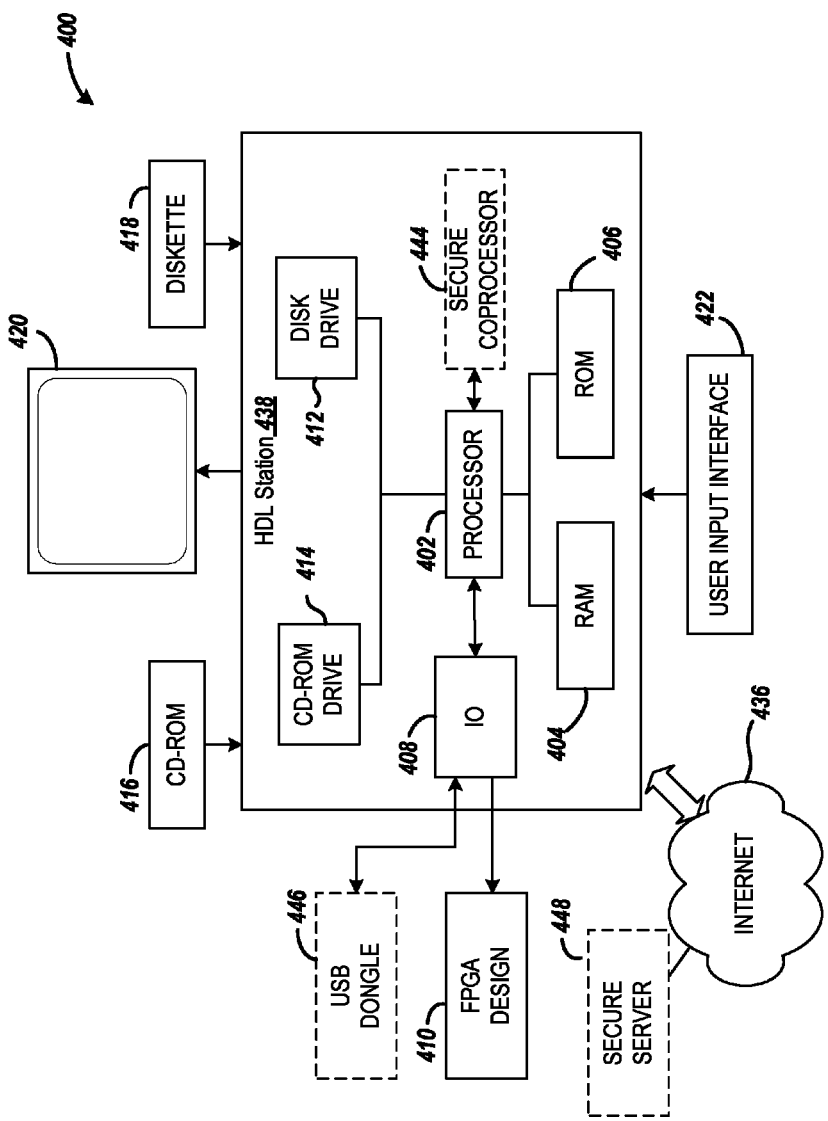
FIG. 4 illustrates a block diagram of an example computing architecture that may be used to implement the design entry tool along with several trusted platform modules in accordance with an embodiment of the invention.

FIG. 4 shows a block diagram of an example computing arrangement that may be used to implement the design entry tool along with several trusted platform modules in accordance with an embodiment of the invention. In this example, the design entry tool is described in terms of a hardware description language (HDL) editor. The exemplary computing arrangement includes HDL station 438, which includes a central processor (CPU) 402 coupled to random access memory (RAM) 404 and read-only memory (ROM) 406. The HDL station 438, CPU 402, RAM 404, and ROM 406 are configured to implement a design entry tool as described above.

The ROM 406 may also represent other types of storage media to store programs, such as programmable ROM (PROM), electronically erasable PROM (EEPROM), etc. The processor 402 may communicate with other internal and external components through input/output (I/O) circuitry 408 to provide, for example, a configuration bit stream to define the functionality of the cores and other programmable logic/interconnect that may exist within FPGA design 410.

HDL station 438 may include one or more data storage devices, including hard and floppy disk drives 412, CD-ROM drives 414, and other hardware capable of reading and/or storing information such as a DVD, etc. Software and IP cores for facilitating the FPGA design definition activities may be stored and distributed on a CD-ROM 416, diskette 418 or other form of media capable of portably storing information. These storage media may be inserted into, and read by, devices such as the CD-ROM drive 414, the disk drive 412, etc.

The IP cores may also be transmitted to HDL station 438 via data signals, such as being downloaded electronically via a network, such as Internet 436. HDL station 438 is coupled to a display 420, which may be any type of known display or presentation screen, such as LCD displays, plasma displays, cathode ray tubes (CRT), etc. A user input interface 422 is provided, including one or more user interface mechanisms such as a mouse, keyboard, microphone, touch pad, touch screen, voice-recognition system, etc.

During development the CPU is configured to transmit encrypted IP cores to a TPM for decryption as described in the above embodiments. Three IP cores implemented with different hardware configurations are shown in FIG. 4. TPM 444 is a secure processor implemented on a common bus with processor 402. TPM 446 is implemented on a USB dongle. The process communicates with TPM 446 via I/O interface coupled to processor 402 via the common system bus. TPM 448 is implemented on an external secure server and is coupled to processor 402 by means of an internet pathway 436 and a network controller (not shown) coupled to the common system bus. It is understood that numerous network transfer protocols may be used to establish, maintain, and route connections to secure server TPM 448 including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

Figure 5:
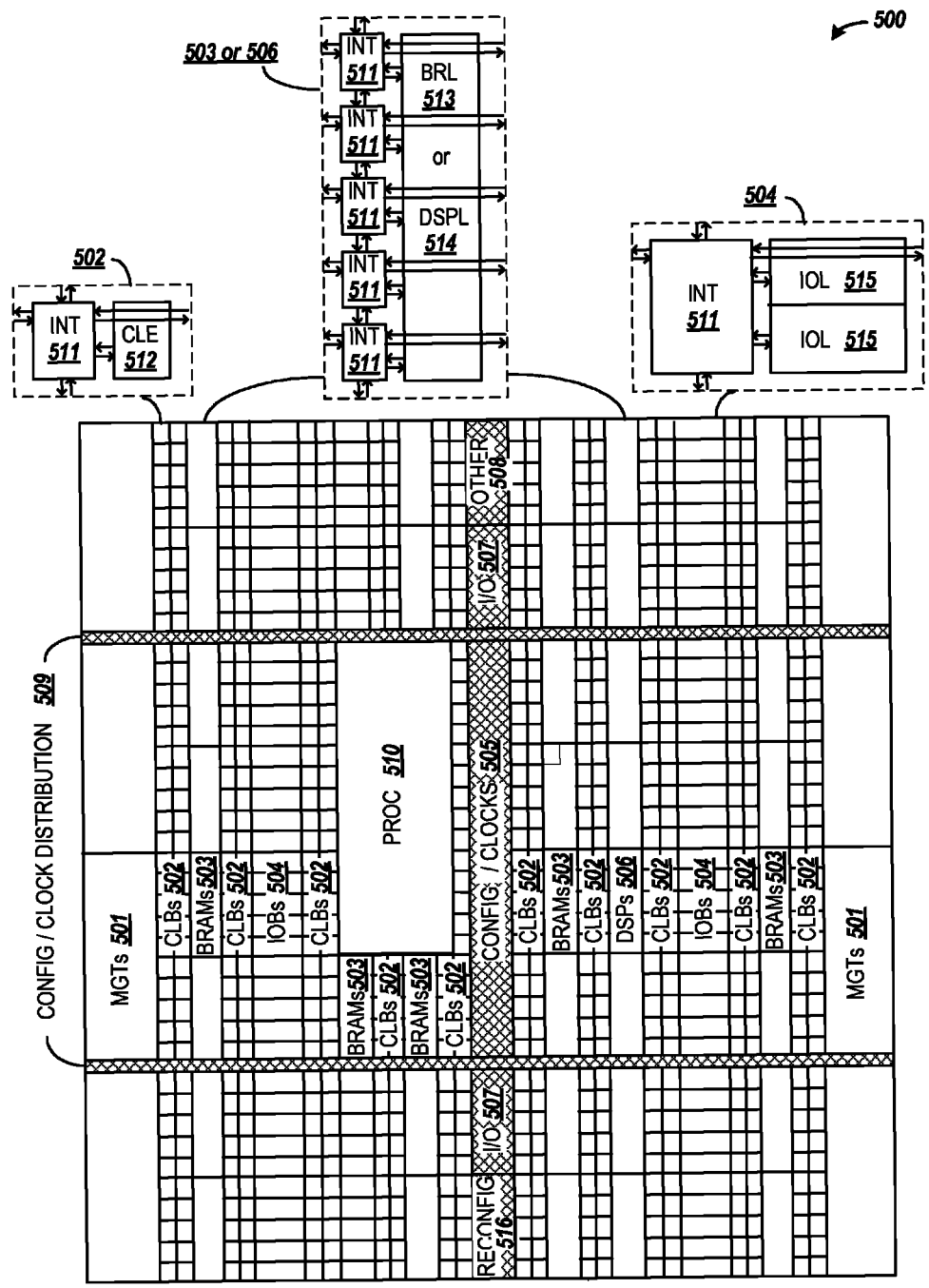
FIG. 5 illustrates an exemplary Field Programmable Gate Array (FPGA) architecture that may be used as a target device in accordance with an embodiment of the invention.

FIG. 5 is a block diagram of an example field programmable gate array (FPGA) which may be the used as a target device in accordance with an embodiment of the invention. The FPGA may also be configured to implement a TPM in accordance with an embodiment of the invention. FPGAs can include several different types of programmable logic blocks in the array. For example, FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), a reconfiguration port (RECONFIG 516), specialized input/output blocks (I/O 507), for example, clock ports, and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Other aspects and embodiments of the present invention will be apparent to those skilled in the art from consideration of the specification and practice of the invention disclosed herein. Thus, it is intended that the specification and illustrated embodiments be considered as examples only, with a true scope and spirit of the invention being indicated by the following claims.

What is claimed is:

1. A method for the secured use of a core using a block diagram based design tool, the method comprising:
   obtaining, by a processor, a core development package including:
      an encrypted core; and
      a decryption key for the encrypted core, the decryption key encrypted with an asymmetric cipher;
   transmitting the core development package from the design tool to a trusted platform module;
   decrypting the decryption key with a private key of the asymmetric cipher by the trusted platform module;
   decrypting the encrypted core by the trusted platform module using the decryption key; and
   performing one or more design tool operations using the decrypted core.

2. The method of claim 1, wherein the asymmetric cipher includes a public key corresponding to the trusted platform module.

3. The method of claim 2, further comprising transmitting the private key corresponding to the public key from the design tool to the trusted platform module.

4. The method of claim 1, wherein the core development package further includes a blackbox interface module defining input and output pins of the core.

5. The method of claim 4, further comprising incorporating the blackbox interface module into a block diagram design model.

6. The method of claim 1, further comprising:
   generating a blackbox interface module within the trusted platform module from the decrypted core, the blackbox interface module including a definition of input and output pins of the core;
   transmitting the blackbox interface module to the design tool; and
   incorporating the blackbox interface module into the block diagram design model.

7. The method of claim 1, wherein the one or more design tool operations are performed within the trusted platform module.

8. The method of claim 1, further comprising performing co-simulation of the core within the trusted platform module.

9. The method of claim 8, wherein performing co-simulation includes:
   transmitting simulation input corresponding to input pins of the core to the trusted platform module;
   simulating the core within the trusted platform module to produce an output; and
   transmitting the output to the design tool.

10. The method of claim 9, wherein the performing co-simulation further includes performing timing simulation of the core within the design tool.

11. The method of claim 1, wherein performing one or more design tool operations using the decrypted core includes:
    transmitting the decrypted core to the design tool over a secure communication channel; and
    incorporating the decrypted core into a netlist of a block level design model.

12. The method of claim 1, wherein performing one or more design tool operations using the decrypted core includes:
 transmitting a netlist of a block level design model to the trusted platform module over a secure communication channel;
 incorporating the decrypted core into the netlist; and
 transmitting the netlist, after incorporating the decrypted core, to the design tool over the secure communication channel.

13. The method of claim 12, further comprising creating an encrypted bitstream from the netlist after incorporating the decrypted core.

14. The method of claim 1, wherein performing one or more design tool operations using the decrypted core includes:
 transmitting a netlist of a block level design model to the trusted platform module over a secure communication channel;
 incorporating the decrypted core into the netlist;
 creating an encrypted bitstream from the netlist after incorporating the decrypted core; and
 transmitting the encrypted bitstream to the design tool over the secure communication channel.

15. The method of claim 1, wherein the trusted platform module is an external device coupled to interact with the design tool through an I/O interface.

16. The method of claim 1, wherein the trusted platform module is an onboard secure processing device.

17. The method of claim 1, wherein the trusted platform module is an external server.

18. A system for core distribution, comprising:
 a first processor, a second processor, and a storage unit coupled to a common bus;
 wherein:
  an asymmetric private key is stored in the storage unit;
  the first processor is configured to receive a secure core development package including an encrypted core and a decryption key for the encrypted core, the decryption key encrypted with an asymmetric public key corresponding to the private key; and
  the second processor is configured to:
   decrypt the decryption key with the private key; and
   decrypt the encrypted core with the decrypted decryption key;
  wherein the first processor is configured to perform one or more design tool functions using the decrypted core, in response to a signal received from a design tool, and produce an output.

19. A method for secure distribution of a core, comprising:
 receiving, by a processor, a request for a core, the request including:
  a core indicator; and
  a trusted platform module serial number;
 encrypting a core corresponding to the core indicator with a symmetric cipher;
 retrieving an asymmetric public key of an asymmetric cipher and corresponding to the serial number; and
 encrypting a decryption key corresponding to the symmetric cipher with the asymmetric public key;
 wherein the trusted platform module serial number corresponds to a trusted platform module that is configured to:
  receive the encrypted core and encrypted decryption key;
  decrypt the decryption key with a private key of the asymmetric cipher by the trusted platform module;
  decrypt the encrypted core by the trusted platform module; and
  perform one or more design tool operations using the decrypted core.

20. The method of claim 19, wherein:
 the request for a core is received from a customer design tool; and delivering the encrypted core and encrypted decryption key includes transmitting the encrypted core and encrypted decryption key to the customer design tool.

* * * * *